United States Patent
Thomas et al.

(10) Patent No.: US 9,867,414 B2
(45) Date of Patent: Jan. 16, 2018

(54) FLAT PANEL TEST HARDWARE AND TECHNOLOGY FOR ASSESSING BALLISTIC PERFORMANCE OF HELMET PERSONNEL PROTECTIVE EQUIPMENT

(71) Applicants: James P. Thomas, Alexandria, VA (US); Christopher J. Kindle, Glen Burnie, MD (US); Peter Matic, Alexandria, VA (US); William R. Pogue, III, Easton, MD (US)

(72) Inventors: James P. Thomas, Alexandria, VA (US); Christopher J. Kindle, Glen Burnie, MD (US); Peter Matic, Alexandria, VA (US); William R. Pogue, III, Easton, MD (US)

(73) Assignee: The United States of America, as representedy by the Secretary of the Navy, Washington, DC (US)

( * ) Notice: Subject to any disclaimer, the term of this patent is extended or adjusted under 35 U.S.C. 154(b) by 659 days.

(21) Appl. No.: 14/207,817

(22) Filed: Mar. 13, 2014

(65) Prior Publication Data
US 2016/0139018 A1    May 19, 2016

Related U.S. Application Data

(60) Provisional application No. 61/781,071, filed on Mar. 14, 2013.

(51) Int. Cl.
*G01M 7/08* (2006.01)
*A42B 3/06* (2006.01)
*G01L 5/00* (2006.01)

(52) U.S. Cl.
CPC .............. *A42B 3/06* (2013.01); *G01L 5/0052* (2013.01); *G01M 7/08* (2013.01)

(58) Field of Classification Search
CPC ........... A42B 3/06; G01L 5/0052; G01M 7/08
USPC ........................................... 73/12.04
See application file for complete search history.

(56) References Cited

U.S. PATENT DOCUMENTS

| | | | | |
|---|---|---|---|---|
| 6,826,509 | B2* | 11/2004 | Crisco, III | 2/422 |
| 7,509,835 | B2* | 3/2009 | Beck | A42B 3/046 2/425 |
| 2008/0289438 | A1* | 11/2008 | Bertocci | G01L 1/205 73/866.4 |
| 2010/0215953 | A1* | 8/2010 | Boussu | F41H 5/0485 428/340 |
| 2010/0311025 | A1* | 12/2010 | Everett | C08L 89/04 434/262 |
| 2011/0060260 | A1* | 3/2011 | Siegler | A42B 3/0473 602/18 |

(Continued)

*Primary Examiner* — Lisa Caputo
*Assistant Examiner* — Tarun Sinha
(74) *Attorney, Agent, or Firm* — U.S. Naval Research Laboratory; Dawn C. Russell

(57) ABSTRACT

A testing apparatus to assess ballistic performance of helmet personnel protective equipment having a flat helmet analog with a helmet shell material in flat panel form and at least one helmet suspension pad; head surrogate components including a skull skin surrogate, a skull bone surrogate, and a brain tissue surrogate; a pressure indicating film adjacent to the head surrogate components; and one or more pressure sensors in the brain tissue surrogate. Also disclosed is the related method for assessing ballistic performance of helmet personnel protective equipment.

20 Claims, 9 Drawing Sheets

(56) References Cited

U.S. PATENT DOCUMENTS

2012/0186002 A1* 7/2012 Bhatnagar ............... A42B 3/063
    2/412
2013/0055790 A1* 3/2013 Bhatnagar ............... G01N 3/313
    73/12.11

* cited by examiner

FLAT PANEL TEST HARDWARE AND TECHNOLOGY FOR ASSESSING BALLISTIC PERFORMANCE OF HELMET PERSONNEL PROTECTIVE EQUIPMENT

PRIORITY CLAIM

The present application is a non-provisional application claiming the benefit of U.S. Provisional Application No. 61/781,071, filed on Mar. 14, 2013 by James P. Thomas et al., entitled "Flat Panel Test Hardware and Technology for Assessing Ballistic Performance of Helmet Personnel Protective Equipment," the entire contents of which is incorporated herein by reference.

BACKGROUND OF THE INVENTION

Field of the Invention

The present invention relates to testing helmets for ballistic performance.

Description of the Prior Art

Current testing methodologies for combat helmet "impact" performance focus on shell perforation, shell backface deformation (transient maximum and post-impact residual), and center-of-mass accelerations of the helmet-head system. The perforation and backface deformation specifications relate to ballistic impact and the helmet-head acceleration specifications to low-velocity impact.

Performance specifications for helmets used for ballistic protection typically set requirements on the minimum V50 ballistic limits for the helmet shells and on the transient deformations of the inner-wall of the shell. Preliminary V50 testing of candidate shell materials in flat panel form is used as an economical method for assessing baseline material configuration performance. Limitations are imposed on the maximum permissible shell (backface) deformations during ballistic impact. Testing is done with clay-filled headforms or with an empty helmet interior using x-ray, photographic, or metal witness plate techniques to capture material deformation during the ballistic impact event. Limitations are also placed on the maximum acceleration induced on a test headform with a finished helmet assembly in place during low-velocity impact by a weight dropped from a specific height, and on shell damage experienced by low-velocity impact with specified impact energy.

The National Institute of Justice, under the US Department of Justice, has NIJ Standard 0106.01 for Ballistic Helmets that establishes performance requirements and test methods for helmets intended for protection against various small arms and rifle threats. These standards assess ballistic penetration and ballistic impact attenuation. Ballistic penetration tests are conducted at specified threat velocities to "verify" V0 requirements using a special headform with sagittal and coronal plane cut-outs containing perforation witness plates. The ballistic impact attenuation tests use an accelerometer affixed to the center-of-mass aligned with the trajectory of the ballistic threat, and measured peak accelerations upon impact are limited to 400 g maximum.

H. P. White Laboratories, Inc. have a testing protocol titled "Test Procedure for Bullet Resistant Helmets" that examines ballistic resistance to penetration by bulleted ammunition and resistance to backface deformations by non-perforating bullet impacts. This procedure uses a similar headform as that used in the NIJ 0106.01 standard. The tests are also V0 verification tests with a very limited number of test shots and failure defined by witness plate perforation. The backface deformation tests utilize the same headform but with the coronal and sagittal slots packed with clay (Plastilini Number 1) to register the transient shell inner-wall deformations. Maximum deformations are recorded, but requirements or limitations are left to be specified by the sponsoring entity.

Understanding and quantifying shell perforation mechanics and load, impulse, and energy transfers to the head are critical for achieving balanced and optimized performance from new helmet systems. While V50 testing is adequate for assessing perforation resistance, transient backface deformation measurements are not capable of quantifying the load, impulse, and energy transfers to the head, and these are the driving forces for brain injury and trauma.

Current state-of-the-art in brain injury/damage risk models use a combination of experimental data and computational analysis methods. Experimental measurements are made with surrogate models to quantify and characterize the loads and deformations imposed at helmet-head interfaces under impact conditions. The experimental results are used as inputs to computational models for predicting the resulting evolution of mechanical state within the skull-brain system. The accuracy of the computational modeling predictions depends on the accuracy of the experimental inputs and the constitutive properties used for the skull and brain components. These computational predictions of the mechanical state can then be used with an appropriate bio-medical risk model(s) to assess the probability of brain injury/damage. Existing clay-based helmet personnel protective equipment (PPE) testing protocols cannot provide the types of data necessary for quantitative assessment of the risk of brain injury/trauma under non-perforating ballistic impacts. More bio-fidelic instrumented headform and/or cadaver testing protocols can provide the needed data, but the testing can be very complex (technically and legally), and costly because of low throughput.

BRIEF SUMMARY OF THE INVENTION

The aforementioned problems are overcome in the present invention which provides a testing apparatus to assess ballistic performance of helmet personnel protective equipment having a flat helmet analogue with a helmet shell material in flat panel form and at least one helmet suspension pad; head surrogate components including skull skin, skull bone, and brain tissue; a pressure indicating film adjacent to the head surrogate components; and at least one pressure sensor in the brain tissue surrogate. Also disclosed is the related method for assessing ballistic performance of helmet personnel protective equipment.

The invention consists of new testing technology (hardware, instrumentation, and analysis) for quantifying the protection capabilities of helmet personnel protection equipment (materials and configurations) under non-perforating ballistic impacts. A flat panel test apparatus has been developed with bio-fidelic head surrogate components (skull skin and bone, and brain) to serve as a 2-D analog to 3-D helmet-head systems for providing early (short-time) dynamic impact force, deformation, and skull damage response data that are relevant to brain injury and trauma. The invention is expected to be useful for helmet design and screening, component performance quantification and ranking, computational model validation studies, and the development of sophisticated brain-injury risk models.

There are several advantages of the current invention over the commonly used clay-based helmet test assessment methods including: generation of data that is directly relevant to brain injury and trauma (e.g., intercranial pressure, surrogate damage like skull cracking); the ability to quantify and rank helmet configuration effects (e.g., suspension pad type and arrangement) on the loads and deformations transmitted to the bio-surrogate components, the ability to use high-speed video to capture back-face helmet shell deformations as a function of time and to correlate visual events with brain-surrogate pressures.

Advantages of the current invention over instrumented headform or cadaver testing of helmet PPE include much simpler preparation and test conduct, much quicker testing with four-shots per setup (e.g., sixty-four shots have been completed in one eight-hour shift on the ballistic range compared with a small fraction of that for the other methods), and much lower test costs (per shot).

These and other features and advantages of the invention, as well as the invention itself, will become better understood by reference to the following detailed description, appended claims, and accompanying drawings.

DETAILED DESCRIPTION OF THE INVENTION

The invention technology utilizes helmet protective outer shell materials in flat panel form integrated with the actual helmet suspension pads (interfaces between helmet and head). The resulting "flat helmet analogue" is mechanically coupled with instrumented head surrogate components (scalp, skull bone, and brain tissue) with tensioned nylon strapping in a test apparatus to assess: (1) short-time dynamic loading (pressures) of the surrogate components with integrated pressure sensing in the surrogate brain tissue, (2) helmet shell backface deflections using high speed video with a side-on view, and (3) surrogate component damage (e.g., surrogate skull bone fracture) upon ballistic impact with small arms, rifle, and fragment threats of interest. Testing has demonstrated that the flat panel technology can be used to provide relatively rapid and low cost assessments of the severity of loading and damage to the head surrogates as a function of test configuration, like suspension pad type and layout or threat type and velocity.

Figure 1:
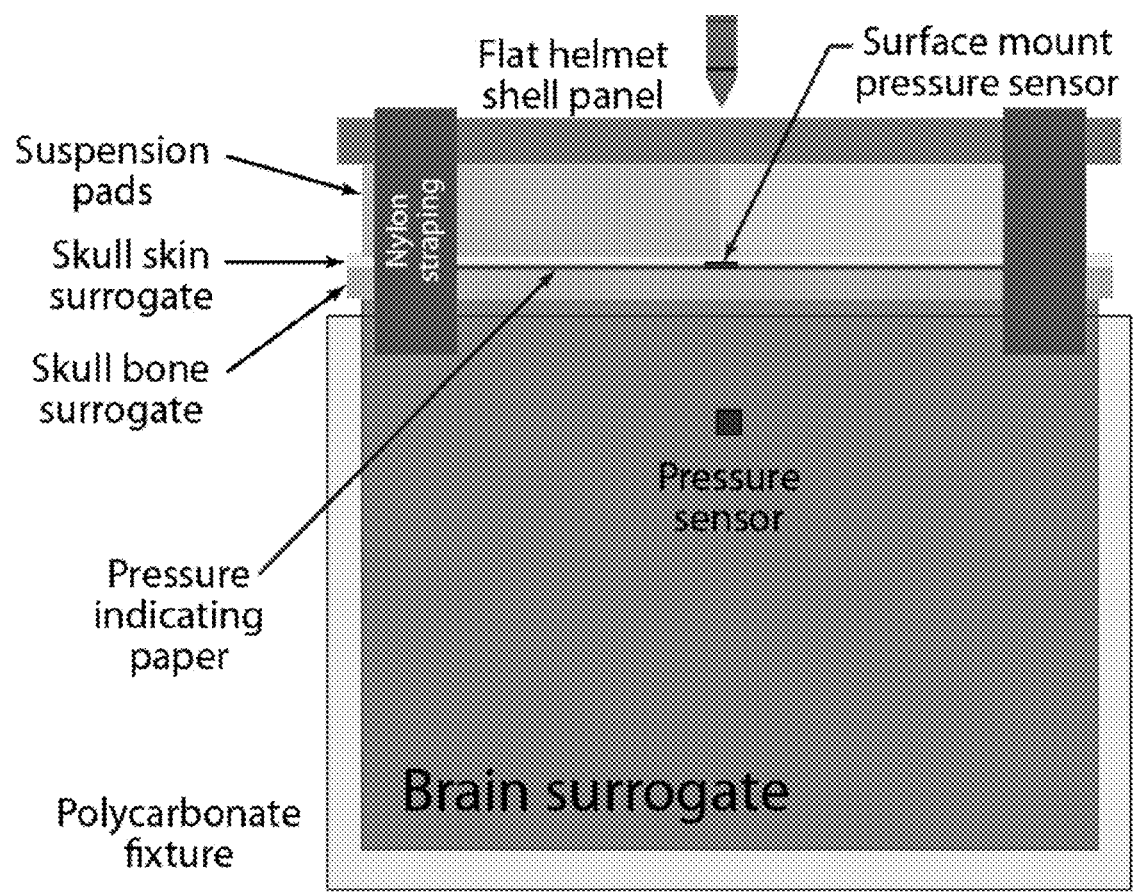
FIG. 1 is a side-view schematic of the flat panel test setup showing the primary components (not to scale).

To achieve representative force/pressure and deformation responses for the 3-D helmet-head system from a 2-D (flat panel) test configuration, a flat panel version of the actual helmet shell is used that maintains areal density (thickness) and material "meso/microstructure." This panel is then coupled with actual helmet suspension pads to surrogate scalp, skull, and brain components with representative meso/microstructure, mechanical properties, and thicknesses. FIG. 1 shows a schematic of the test concept with helmet components and head surrogates. Measurements include, but are not limited to: pressure sensing in the surrogate brain and between the suspension pad and skull surrogate, surrogate scalp, skull bone, and brain tissue component damage like skull fracture, and helmet shell and pad deformations (front or back face) via front and/or side-view high-speed video.

The test apparatus and methods of the present invention can be used to assess the influence of helmet shell variables (e.g., materials, layups, thicknesses) and suspension pad variables (e.g., materials, geometry, arrangement) on the impact pressure within the brain surrogate and between the suspension pad and skull surrogate, the damage occurring to the skull surrogate (e.g., cracking, delamination, and fracture), and the extent of backface deformation by the helmet shell during impact by any ballistic threat of interest (type and velocity). Various sensors can be used including a pressure sensor between the skull skin surrogate and the skull bone surrogate; a strain gage on the helmet shell, the skull bone surrogate, or both; a force sensor between the suspension pad and head surrogate components; a displacement gage between the helmet analogue and the head surrogate components; ink-filled spheres in the brain tissue surrogate that rupture at a given pressure; or any combination of these.

The early-time force/pressure and deformation responses from the apparatus of the present invention are designed to be representative of those experienced by a 3-D helmet PPE system. An early-time response means a response prior to boundary interactions (e.g. within 100 microseconds for example data presented herein). The scaling strategy needed to achieve this is one that adopts similar helmet/head mechanical properties (e.g., densities, elastic moduli, fracture strength, etc.) and component thicknesses between the two systems. The longer-time responses, which are significantly affected by the complex 3-D geometry and boundaries, will consist of complex stress-wave reflections and interactions.

The invention was developed and demonstrated using an aramid-phenolic composite plate, commercial foam helmet suspension pads, and custom-made bio-simulant head components. The invention is not dependent on any particular helmet system or bio-simulant materials/components. Other helmet systems or body armor systems can be tested as long as the helmet's ballistic protection shell (or body armor component) can be made in flat panel form. Similarly, the bio-fidelic surrogate components can be customized to the particular human body tissue or bone properties associated with the protective armor being tested. Some bio-fidelic surrogate components can actually be purchased commercially (e.g., skull skin and bone from Synbone), and others can be custom fabricated (to a specific geometry) using commercially available materials (brain tissue or muscle tissue using polymeric gels).

The apparatus and technology can also be used to characterize the performance of other types of personnel protection equipment (PPE) under non-penetrating ballistic impacts (i.e., behind armor blunt trauma, BABT), blast impact, and low-velocity impacts as long as the flat samples can be obtained. Other bio-simulant materials (e.g., skin and muscle tissue simulants) might be appropriate for other types of PPE relative to the surrogate materials used for the helmet protection performance assessments demonstrated in this case (i.e., skull skin, bone, and brain tissue).

Test Materials: Helmet Shell Panels

The material/thickness scaling process was performed for an aramid-phenolic composite helmet shell system. This composite shell has an areal density of 2.3-2.4 lbs/ft$^2$. The flat panels were consolidated, and comprise ~23 prepreg layers comprising a 0/90 degree para-aramid fiber weave with a phenolic-polyvinyl butyral (PVB) matrix. Two different layups were utilized for testing: simple layering of the prepregs with uniform 0/90 degree orientation, and a symmetric layup with 0/90 and ±45 degree fiber orientations, multiple interleaving between paired layers to achieve material overlaps, and panel edge-binding using an adhesively bonded elastomer C-channel on the perimeter. The former configuration is referred to herein as the "0/90 layup or configuration" and the latter as the "clocked layup or configuration." The clocked configuration was developed to better represent the layups used to create some 3-D helmet shell material configurations. The planar dimensions for both configurations were 13 inch×13 inch resulting in a total panel weight of ~2.7 lbs. Panel thickness is controlled by the areal density and averaged around 0.3 inches thick. Each helmet panel consists of four shot-quadrants, each 6.5 inch× 6.5 inch in dimension.

Test Materials: Ceramic Appliqué Materials for Enhanced Shell Performance

In one embodiment of the invention, ceramic tile appliqués are used on the shell material to assess performance against rifle threats. SiC—B$_4$C ceramic tile appliqués were adhesively bonded to the striking face of the aramid-phenolic panels for all the flat panel tests conducted with 7.62 mm threats. The tiles were 4 inch×4 inch in planar dimension and either 0.200 inch thick (nominal; for the 7.62×39 mm MSC threat) or 0.275 inch thick (nominal; for the 7.62×51 mm M80 Ball threat). The tiles had an average measured density (immersion) of 2.66 g/cm$^3$ and a modulus ranging from 383 to 415 GPa.

Encapsulation was recommended for their ceramic appliqués with a 0.030 inch thick polyurea coating for spall containment, and adhesive attachment to the substrate using a 0.030 inch thick bondline. There was interest in directly observing the cracking of the appliqué materials on impact, and therefore, most of the testing was performed with bare tiles. However, the strike faces of twelve flat tiles (3 panels worth) in each thickness (0.200 and 0.275 inch) were coated with polyurea, 0.030 inch thick, to assess the effect of polyurea coating on the ballistic perforation resistance (V50). Bare tiles were utilized for all of the fully instrumented flat panel tests against 7.62 mm rounds.

The tiles were bonded to the flat panels using 3M's DP-620NS Urethane Adhesive, a black, two-part, bubble-free, non-sag paste adhesive. At room temperature, this adhesive mixture gels in ~20 minutes, sets within 4 hours, and fully cures in forty-eight hours. Precise bondline thicknesses (0.028 inch for the V50 testing and 0.060 inch for all instrumented testing) were obtained by placing lengths of nylon monofilament of the required diameter between the tile and panel in the adhesive zone. The aramid-phenolic panels were lightly abraded in the tile bonding regions followed by an isopropyl alcohol (IPA) wipe. The bonding surface of the tiles was cleaned with IPA followed by the application of 3M 3901 Metal Primer via airbrush to obtain a thin, uniform layer. The primed tile surfaces were air dried/cured prior to adhesive bonding and showed a slightly pink hue from the primer coat. Adhesive was applied to the tile in excess of the required thickness, and the tile was placed and pushed onto the aramid-phenolic panel to make contact with the monofilament spacers. The excess adhesive was pushed out the sides and removed, and an adhesive bevel was formed between the tile edge and panel surface. After the adhesive set-up (~20 minutes), the panels were left to cure in ambient air for a minimum of 48 hours prior to ballistic testing.

Test Materials: Suspension Pads

Commercial foam helmet suspension pads, 0.75 inch thick, were used and attached to the panel using the standard "hook-disks" (circular tabs with adhesive on one-side and Velcro-like hooks on the other for securing the pads).

Test Materials: Head Simulant Materials

The head surrogate components, human skull skin, bone, and brain tissue, were fabricated from synthetic polymer materials with representative mechanical properties. They were scaled in thickness to corresponding representative averages for human components. The scalp (skull skin) was a silicone-based elastomer 0.12 inch thick (~3 mm) and 6 inch×6 inch (152 mm×152 mm) in planar dimension. The skull bone plates were sandwich composites with outer-layers of a milled fiberglass-epoxy material, each 0.08 inches (~2 mm) thick, simulating the compact (cortical) bone, and a core of polyurethane foam material 0.16 inches thick (~4 mm) simulating the spongy (trabecular) bone. The overall dimensions of the skull surrogate plates were 0.34 inches (8.6 mm) thick by 6 inch×6 inch in planar dimension. The skull surrogate properties were designed to match tensile stiffness, strength, and fracture toughness of the cortical tables and flexural stiffness, strength, low-velocity impact strength of the composite cranium bone properties.

The brain surrogate was a 6 inch×6 inch×6 inch cube of two-part cast dielectric silicon gel (Dow Sylgard 527) that was used as brain tissue stimulant in several prior studies. Each cube had one PCB ICP 138M184 pressure sensor (described below) embedded 1.0 inch below the impact surface located at the center of the impact face plane. The sensor face was oriented perpendicular to the cube impact surface. The cubes were cast in two-steps. The first pour (roughly one-half the total volume of the finished cube) embedded the pressure sensor at its desired location using a removable mold wall with a drilled cavity to hold the sensor in-place. The first pour was oven-cured at 100° C. for three hours. The removable mold wall was then carefully removed leaving the pressure sensor in-place. The second pour was then made followed by that same cure cycle: 100° C. for three hours. The cube was demolded after cooling and coated with talc powder to reduce surface tackiness.

The head surrogate material compositions should have geometry (e.g. thickness) and material properties that are representative of a human head. Some relevant material properties include density, elastic moduli, impact toughness, etc.

The apparatus size does not matter. It can be made larger or smaller to represent other body regions. Although most of the discussion herein represents the head, the testing apparatus can be designed for any personnel protective equipment. In the case of other body regions, the surrogate body material should be representative for the region of the body being protected.

Apparatus Design and Fabrication

Figure 2:
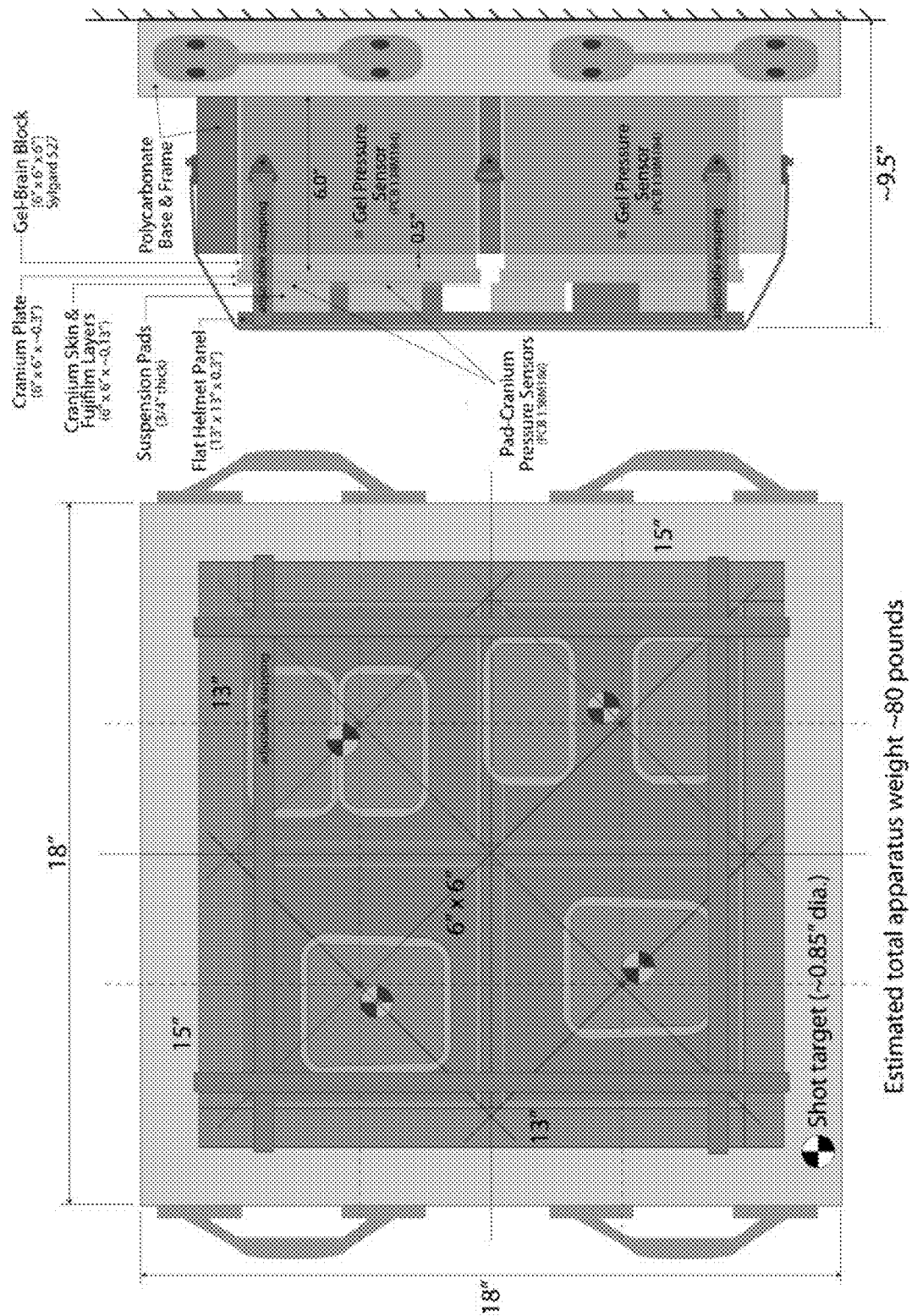
FIG. 2 is a plan and cross-section schematic view of the flat helmet panel test apparatus.

A polycarbonate fixture was used for housing the instrumented flat panel components during ballistic testing. The fixture has four independent instrumented ballistic test zones (quads) for impact characterization. Polycarbonate is used because it is a tough, resilient plastic material that can withstand high-rate impacts by possible errant ballistic threats without failing (fixture cracking or fracture). A schematic of the fixture is shown in FIG. 2. The base is 18 inches square by 2 inches thick, and the vertical quad side walls are 1 inch thick. Each quad is 6.25 inch×6.25 inch in planar dimension, and the vertical walls are 5.5 inches in height. The vertical sides of the interior of each quad are lined with a closed-cell polyethylene (PE) foam ~0.25 inch thick to achieve a snug fit of the Sylgard gel-cube within the quad cavity. It readily compresses and mechanically isolates the gel cube from the fixture walls. The gel-brain surrogates are 6.0 inches in height and rest directly on the polycarbonate base plate. The impact surface of the gel-brain, the surface in contact with the skull plate, extends ~0.5 inch above the fixture walls. This provides an unconstrained region that can accommodate potentially large compressive deformations by the helmet shell and skull surrogate components during ballistic impact. Pressure sensor wiring is routed on-top of the interior quad walls for protection from ballistic spall and for convenient and easy handling.

Laboratory-Scale Apparatus

The capability for testing in a controlled laboratory setting enables more detailed (basic) studies of impact response, characteristics, and interactions associated with the helmet PPE and human surrogate components in the context of the flat panel test apparatus and methods. Such basic laboratory studies with controllable loading characteristics (spatial and temporal) will provide more advanced models/understanding of helmet PPE materials and their dynamic response.

A smaller, lighter, "one-cavity" instrumented fixture was designed and fabricated for laboratory testing. All of the key fixture dimensions (cavity) and material properties/sizes are identical with the larger quad fixtures, and all of the test-related components other than the flat helmet panel (i.e., the head surrogate components and the suspension pads) remain the same. The flat helmet panels for this apparatus are one-quarter size in the planar dimension (i.e., 6.5 inch×6.5 inch) but have the same areal weight density.

Some exploratory tests were conducted with the lab-scale apparatus. An Instron Dynatup 9210 Low-Velocity Impact Test System with instrumented load tup, velocity measurement, and data acquisition was used to input a controlled impact load. As configured, it was capable of inputting (impact) energies in the range: 3-220 ft-lbs (5-300 J) and impact velocities up to 16.4 ft/sec (5.0 m/s). For comparison, the impact energies and velocities of the ballistic threats were: 64 gr. RCC at 1600 ft/sec→365 ft-lbs energy; 124 gr. 9 mm FMJ at 1500 ft/sec→620 ft-lbs energy; 123 gr. 7.62×39 mm MSC at 2000 ft/sec→1100 ft-lbs energy; and 149 gr. 7.62×51 mm M80 Ball at 2400 ft/sec→1900 ft-lbs energy.

Different instrumentation was employed with the lab-scale experiments. National Instruments Model NI 9234, a four-channel C Series dynamic signal acquisition module with integrated electronic piezoelectric (IEPE, commonly denoted as ICP) conditioning, was used. The modules had 24-bit DAQ resolution and could simultaneously digitize signals at rates up to 51.2 kS per channel. Note that this digitization rate would not be fast enough to accurately capture the pressure signals in the ballistic impact tests. National Instruments Signal Express software was used to capture the pressure sensor and impact load data (analog output from the Dynatup) as a function of time.

While the impacts possible with the lab system are significantly less energetic than experienced on the range, the lab system is much more precise and repeatable. The lower impact energies will not affect the elastodynamic response of the helmet panel-pad-head surrogate system.

Pressure Measurements and Instrumentation

PCB Piezotronics, Inc.'s piezoelectric charge-based pressure sensors were used to measure the stress (pressure) waves transmitted through the flat helmet shell panel, pads, and surrogate skull into the surrogate gel-brain during ballistic impact. The PCB sensors use Integrated Circuit Piezoelectric (ICP) technology to provide a low impedance voltage output signal that eliminates lead-wire effects. A wide variety of sensors (physical sizes, pressure ranges, response, etc.) and instrumentation are available from PCB and other vendors.

Model 138M184 pressure sensors were embedded in the gel-brain cubes. The sensors had a calibrated pressure measurement range of 0 to 500 psi and a resonant frequency >1 MHz. For select tests, surface-mount sensors 138M186 (0-2000 psi) were mounted on the surrogate skull plate beneath the surrogate skull skin and suspension pad to quantify the pressure loads transmitted from the suspension pads to the skull.

Instrumentation for the PCB pressure sensors included: PCB Model 481A03 Signal Conditioner with analog outputs read by National Instruments (NI) PXI-6115 data acquisition (DAQ) unit with PC controller Model NI PXI-8106 controlled by NI Labview. The PCB 481A03 conditioner was setup with a gain of 1×, no filtering, and 10 V full-scale output providing frequency response in the range of ~0.5 to 100 kHz. The NI DAQ system used 12-bit sampling at rates as high as 10 Ms/sec/channel. Break screens (i.e., paper with an electrical grid placed in the path of the ballistic threat, which when pierced, provides a 5 V TTL signal for triggering data acquisition and high speed video) were used to trigger the data acquisition and high-speed video processes. A 500 kHz sampling rate was used for the data acquisition for all instrumented testing. A total of 100 msec of data was collected for each instrumented shot with 10 msec of pre-trigger data and 90 msec of signal data. The conditioner provided a 5 V output at the calibrated maximum pressure for each sensor. According to PCB, the ICP amplifier integrated with each sensor can handle pressure inputs ~1.5-2× larger than the calibration maximum and still provide linear output (5 V at the full-scale calibration pressure). The ICP condition-amplifier can handle inputs up to 10 V, hence the measurement range of each sensor was increased ~1.5-2× from the maximum calibration pressure. With the surface mount sensors (138M186), the increase was <1.5×; for the gel embedded sensors, the increase was closer to 2×. Most of the 138M186 surface mount sensors experienced pad-skull plate pressures in the 3000 psi range and showed saturation in the recorded signal.

Fujifilm Prescale pressure indicating films were used to measure the distribution and magnitude of pressure (time averaged) between the suspension pad and surrogate skull plate. These films work by using embedded, ink-filled microspheres that are crushed at a given pressure. The color "density", measured using a calibrated scanner and software system, provides quantitative information about the pressure magnitudes and distribution. Films are available for measurement over an extensive range of pressures.

High-Speed Videography

Photron FASTCAM Models SA1.1 (monochrome sensor; 20 μm pixel size) and SA5 (color sensor; 20 μm pixel size) high-speed video systems with 16 GB internal memory were used to capture the backface deformations of the flat helmet panels during ballistic impact. The cameras were mated with a Nikon Zoom-NIKKOR 35-200 mm F/3.5-4.5 AIS lens, and incandescent lighting with a Pallite VIII quartz-halogen ring-light (2400 W total) and two Tota-light tungsten-halogen lamps (750 W each). Typical settings: aperture, f~5.6; focal length (macro zoom)~40-70 mm; 2-4 low-bit shifting. Frame rates and shutter speeds: 75,000 frames/sec rate and 1/130,000 sec shutter speed with the 7.62 mm threats→256× 128 pixel resolution with the SA1.1; 30,000 frames/sec rate and 1/30,000 sec shutter speed with the 64 gr. RCC and 9 mm threats in Phases I and II 512×448 (or ×320) pixel resolution with the SA5. With a clear gel brain surrogate, high-speed imaging from a side view can also show skull and/or brain compression. Although high-speed videography is described herein, any appropriate imaging technique may be used (e.g., flash radiography, x-ray, etc.).

Test Apparatus

FIG. 1 shows a cross-section view of one quad of the apparatus. The pad-skull and gel pressure sensors are centrally located within each apparatus quad (i.e., at the center of the skull plate and gel cube impact plane). The ballistic impact point on the flat helmet panel, however, is offset ~0.71 inch from each quad center (0.5 inch horizontal and 0.5 inch vertical) so as to maintain a 1.0 inch horizontal and vertical separation distance between the shot impact points in each quad. This lateral offset will produce an oblique angle of contact by the passing stress-wave fronts over the sensor faces, which can complicate the resulting pressure-time signals and their interpretation.

Ballistic Testing

Figure 3:
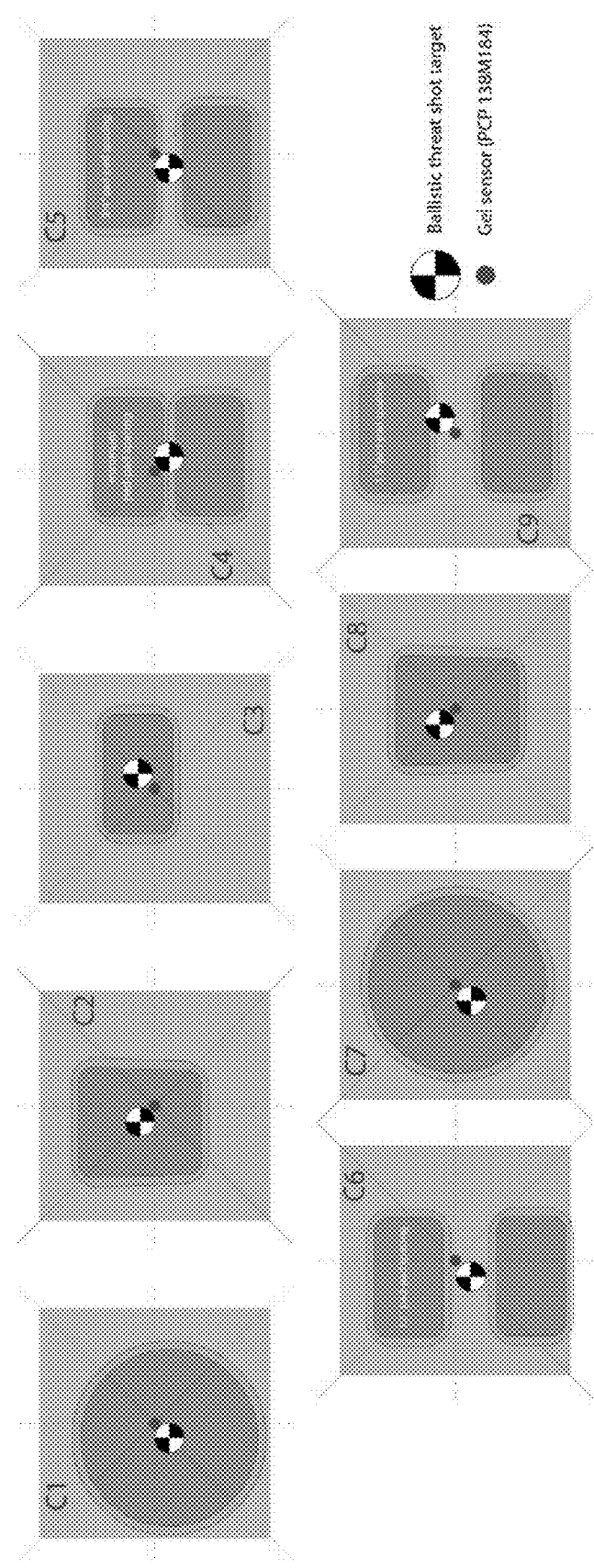
FIG. 3 shows test configurations for the suspension pads in a given "shot" zone or quadrant.

The test variables considered included: flat helmet panel configuration, pad configuration, and ballistic threat. Two aramid-phenolic flat panel layups were tested, the 0/90 layup and the clocked layup. In addition, all panels tested against the 7.62 mm rifle threats had the ceramic appliqué tiles adhesively bonded to the strike face. Nine different pad configurations were initially tested, but several configurations were dropped from the later sets of tests based on the results. The tested pad configurations are shown below in FIG. 3.

All of the ballistic testing was performed using standard procedures. Projectile velocity measurements were obtained using Oehler Research model No. 57 infrared screens with Hewlett-Packard (HP) counter chronographs (universal counters, HP model No. 53131A). Four threat types were tested including: 64 gr. RCC at 1500 and 1600 ft/sec (nominal); 9 mm FMJ (124 gr.) at 1400 and 1500 ft/sec (nominal); 7.62×39 mm Mild Steel Core (MSC; 123 gr.) at 1980 and 2380 ft/sec (nominal); 7.62×51 mm M80 Ball (149 gr.) at 2380 ft/sec (nominal). All projectiles were fired from a universal receiver which was fitted with the appropriate barrel and mount. Shots against the instrumented panels were performed at 0 degrees obliquity and ambient range temperature (70 degree F.). The instrumented apparatus was mounted and clamped to a rigid fixture in the range. All firings were conducted at a fixed distance from the target; the 64-grain and 9-mm projectiles were fired at 15 ft, and the 7.62-mm projectiles were fired at 25 ft. The threat projectiles were required to have no greater than 5° total yaw. Projectile yaw was measured to ensure that the test impacts were within these constraints. This was accomplished by placing a yaw card at the appropriate gun-to-target range during velocity verification shots.

Fully-Instrumented Test Preparation

The flat helmet panels were prepared prior to arriving at the range. For tests with 7.62 mm threat, the ceramic tiles were adhesively bonded to the front strike face of the panels. For tests with the high-speed video capture of the backface deformations, the panel backface (quads of interest) were lightly spray painted white followed by a clear reflective coating to provide better contrast in the video image. All of the panels were pre-marked on the front and back with serial number, quadrant listings, shot target and cube-center location points, shot numbers, front or back and top (up) designations, test phase and number, and threat.

The quad fixture was prepared for testing while resting horizontally on a table. The first step was to "dust" the impact surface of the cubes with talc powder to reduce tackiness. The components were then assembled on the gel-cube faces in the following sequence: skull plates (with or without the surface mount pressure sensor), two-layers of Fujifilm pressure indicating paper (with different pressure ranges), and skull skins (scalps), in each fixture quadrant. Standard adhesive-backed hook-discs were first attached to the pads in the desired pattern, and then the pads arranged on the helmet panel backface in the desired configuration. The adhesive layer on the hook-discs was used to affix the discs-pads to the panel backface. The panel with attached pads was then placed onto the fixture with the pads contacting the skull skin layers. The woven nylon tension straps attached at the fixture sides were draped over the outside surface of the flat panel along the four outer edges. A twenty pound weight was placed on the helmet panel for consistent "clamping pressure", and the straps were pulled taught and locked in-place to maintain panel-pad pressure against the skull surrogates. After the components were strapped in-place, the entire apparatus was mounted vertically and clamped to the ballistic test frame. A bundle of pressure sensor leads exited from beneath the flat helmet panel and were connected by BNC-coaxial cabling to the sensor conditioning and DAQ instrumentation in the range control room. High-speed video camera(s) and lighting were also setup for a side-view capture of the backface deformations.

Laboratory Testing

A series of impact tests were conducted with the lab-scale apparatus using quarter-sized aramid-phenolic panels and the dual, small-pad configuration, C6. Impact energies ranging from 5 to 55 ft-lbs (7 to 70 J) were applied in increments of 5 ft-lbs with replicates at each level. Some additional testing was conducted to assess the influence of the pads and skull surrogates on the gel-block pressure signal. Two sets of tests were conducted. The first with a C6 pad configuration mated to the skull surrogates (skin and skull bone plate) resting on the gel block and the second with the quartered aramid-phenolic panel resting directly on the gel-block.

The energy levels used in these tests is far below the ~300-2000 ft-lbs experienced in the ballistic testing, however, the results are expected to be useful for developing more accurate and repeatable testing procedures and for quantitatively assessing the dynamic response characteristics of the various helmet PPE components.

Perforation Tests

For one phase of testing, 64 gr. RCC and 9 mm FMJ threats were tested against the 0/90 layup panels at two striking velocities to verify non-perforation. In essence, these were V0 verification tests. Shooting began at lower target velocities (1500 fps for the 64 gr. RCC threat and 1400 fps for the 9 mm FMJ threat), which were then increased to higher target velocities (1600 fps for the 64 gr. RCC threat and 1500 fps for the 9 mm FMJ threat) and above as the testing progressed. A maximum striking velocity of 1742 ft/sec was reached for the 64 gr. RCC threat without perforation, and a maximum striking velocity of 1839 ft/sec was reached for the 9 mm FMJ threat without perforation.

Then the testing procedure was modified to determine actual V50 values for the panels. An estimate of the likelihood of perforation at the target velocities could be made knowing the panel V50 values; perforation was considered unlikely for test target velocities several hundred ft/sec below the flat panel V50 value. Initial shot velocities were set at the target test velocities for each threat (muzzle velocities) and then increased or decreased by ~100 ft/sec for non-perforating or perforating shots, respectively.

Results for the 7.62×39 mm MSC threat tests with bare and polyurea coated ceramic appliqués showed that the coating seemed to slightly degrade the V50 performance, but the 72 ft/sec decline in V50 might not be statistically significant. The occurrence of a penetration near a target velocity (i.e., 2380 ft/sec) provided ample warning of the likelihood of panel perforation with this threat. Panel penetration occurred, in fact, in the first set of shots with this threat, and the velocity was subsequently reduced by 400 ft/sec to 2000 ft/sec for all remaining tests with this threat.

Results for the 7.62×51 mm M80 Ball threat tests for bare and polyurea coated ceramic appliqués showed that the flat panels experienced very large out-of-plane deformations with this particular threat, which led to extensive debonding of the ceramic appliqué tiles in the adjacent shot quadrants (vertical and horizontal neighbors). Frequently, only two valid shots were obtained from each panel instead of four. The tiles detached from the panel because of "delamination" of a thin gel-coat layer on the panel surface, not adhesive fracture. An estimate for V50 of ~3220 ft/sec was obtained with the polyurea coated configuration. The last four shots were taken at ~1900 ft/sec, and at this lower threat striking velocity, no tile detachment was observed. Based on this result, it was decided to lower the velocity target for this threat by 400 ft/sec to 2380 ft/sec for all the subsequent tests.

In another phase of testing, V50 tests were performed on the clocked aramid-phenolic panels against the 64 gr. RCC, 9 mm FMJ, and 7.62×39 mm MSC threats, the latter with ceramic appliqué. For the 64 gr. RCC threat, a V50 equal to 1683 ft/sec was obtained, and this was very close to the target velocity of 1600 ft/sec. Additional shots taken in this test at ~1600 ft/sec showed two actual penetrations. Regardless, the 1600 ft/sec velocity was used in testing, and the results indeed show that multiple perforations occurred. The V50 value for the 9 mm FMJ threat (1900 ft/sec) was shown to be significantly higher than the target velocity (1500 ft/sec). The V50 value obtained for the 7.62×39 mm MSC threat (2579 ft/sec) was very close to the 2650 ft/sec value obtained with the 0/90 layup panels, and it far exceeded the test target velocity used in other testing (1980 ft/sec).

There were differing deformations resulting from 9 mm FMJ ballistic impact between the two helmet panel configurations. The 0/90 panel exhibited delamination over a larger area than the clocked panel, and larger lamina creases on the front that are oriented along the 0 and 90 degree fiber directions. The deformations appear to be more localized on the clocked panel, and the creases on the front are much narrower and smaller in length and more randomly oriented.

Fully Instrumented Tests

Figure 4:
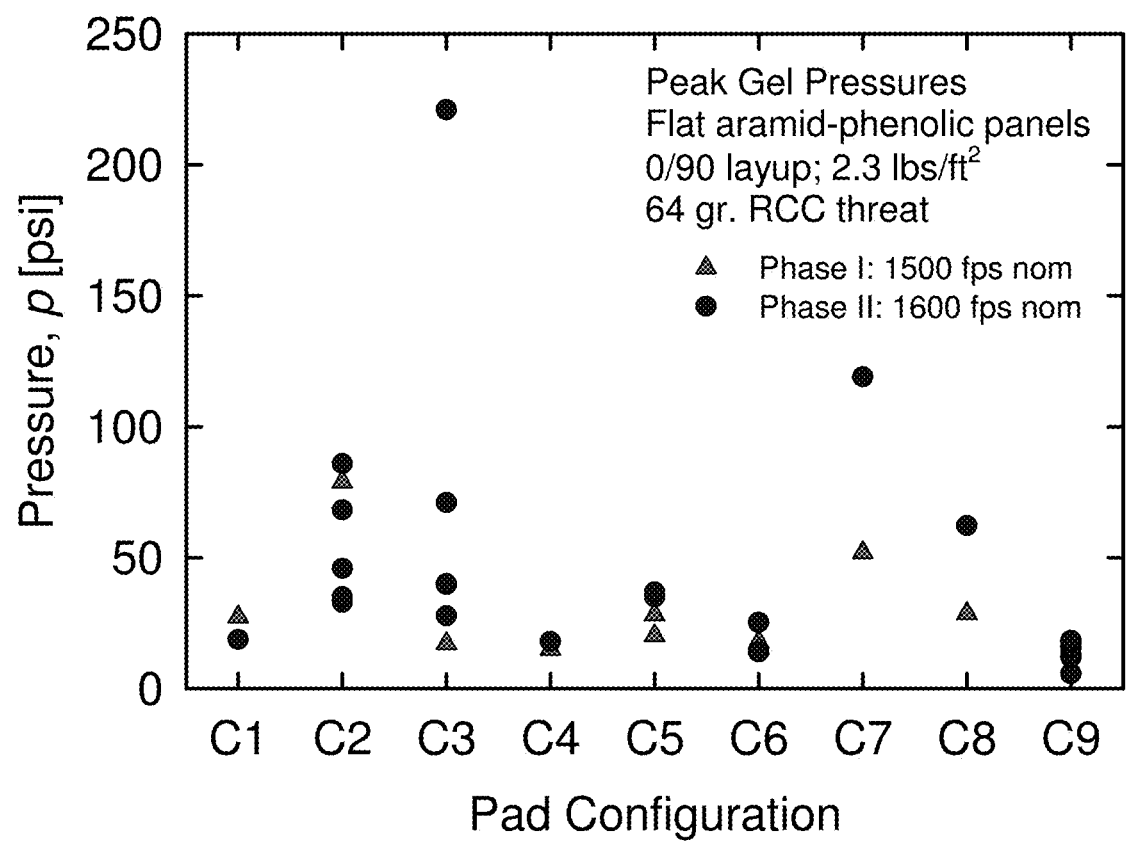
FIG. 4 shows pad configuration effects on peak gel pressure for the 64 gr. RCC threat.
Figure 5:
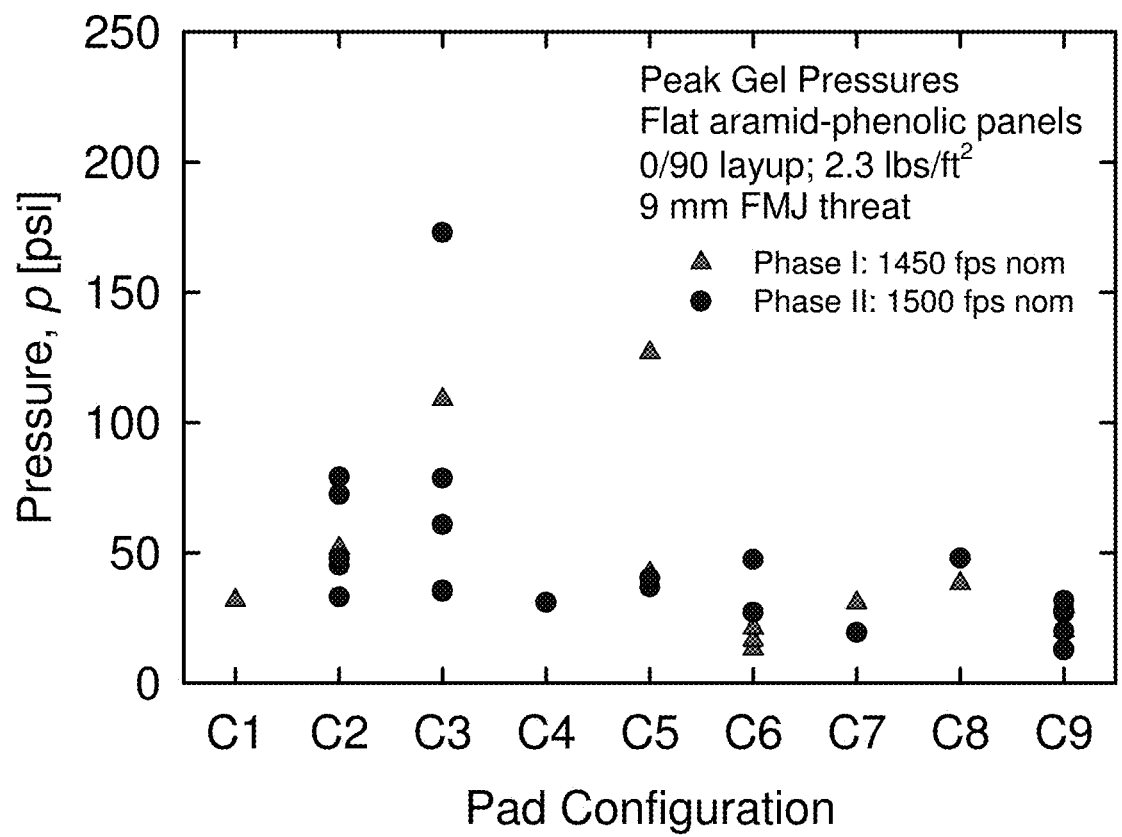
FIG. 5 shows pad configuration effects on peak gel pressure for the 9 mm FMJ threat.

Nine different pad configurations (C1-C9, see FIG. 3) and two different threats (64 gr. RCC and 9 mm FMJ) were tested. The data collected for each shot comprised peak gel pressure, pad-skull pressure via Fujifilm pressure paper, and backface deformations high-speed video in select cases. FIGS. 4-5 show the peak gel pressures for each threat and pad configuration. The pressures are generally below 100 psi with a few points above this with each threat. Pad configurations C2, C3, and C7 show the highest peak pressures, and C1, C4, and C9 show the lowest peak pressures against the 64 gr. RCC threat (FIG. 4). For the 9 mm FMJ threat, pad configurations: C2, C3 and C5 show the highest peak pressures, and C1, C4, C7, and C9 show the lowest peak pressures (FIG. 5). Scatter in peak pressure is greatest for the small single pad configuration, C3, for both threats. Configurations C4, C5, and C6 correspond to "between-pad" shots; peak pressure decreases slightly with distance between pads (i.e., PP for C6<C5<C4). With the 9 mm FMJ threat, the pad-centered shot configurations: C1, C2, and C3 did not have much apparent effect on peak pressure when compared with the corresponding non-pad-centered shot configurations: C7, C8, and C9. The same may not be true with the 64 gr. RCC threat; the larger peak pressures with C7 are anomalous. Pad configurations C4, C7, C8, and C9 were not used in subsequent testing. There appeared to be a negligible effect of strike velocity on peak pressure in the brain surrogate gel within the range of test data for the two threats.

Figure 6:
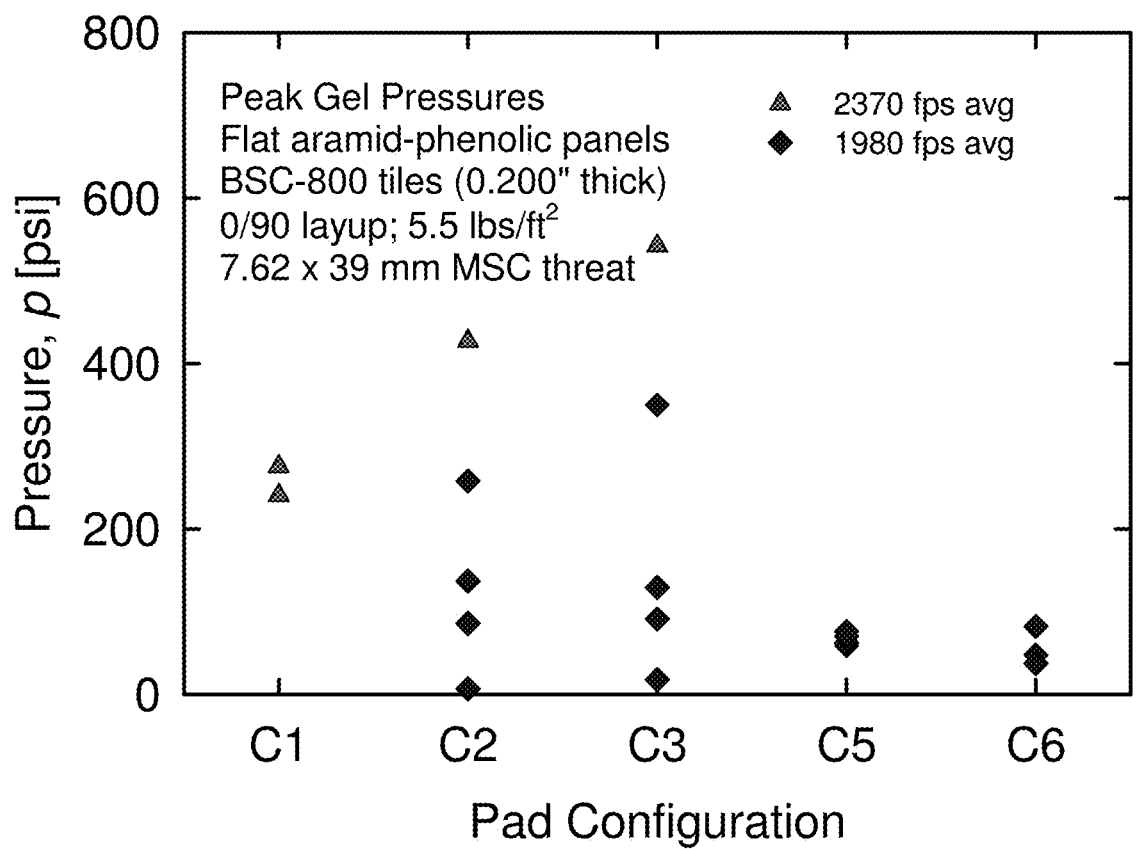
FIG. 6 shows pad configuration effects on peak gel pressure for the 7.62×39 mm MSC threat.
Figure 7:
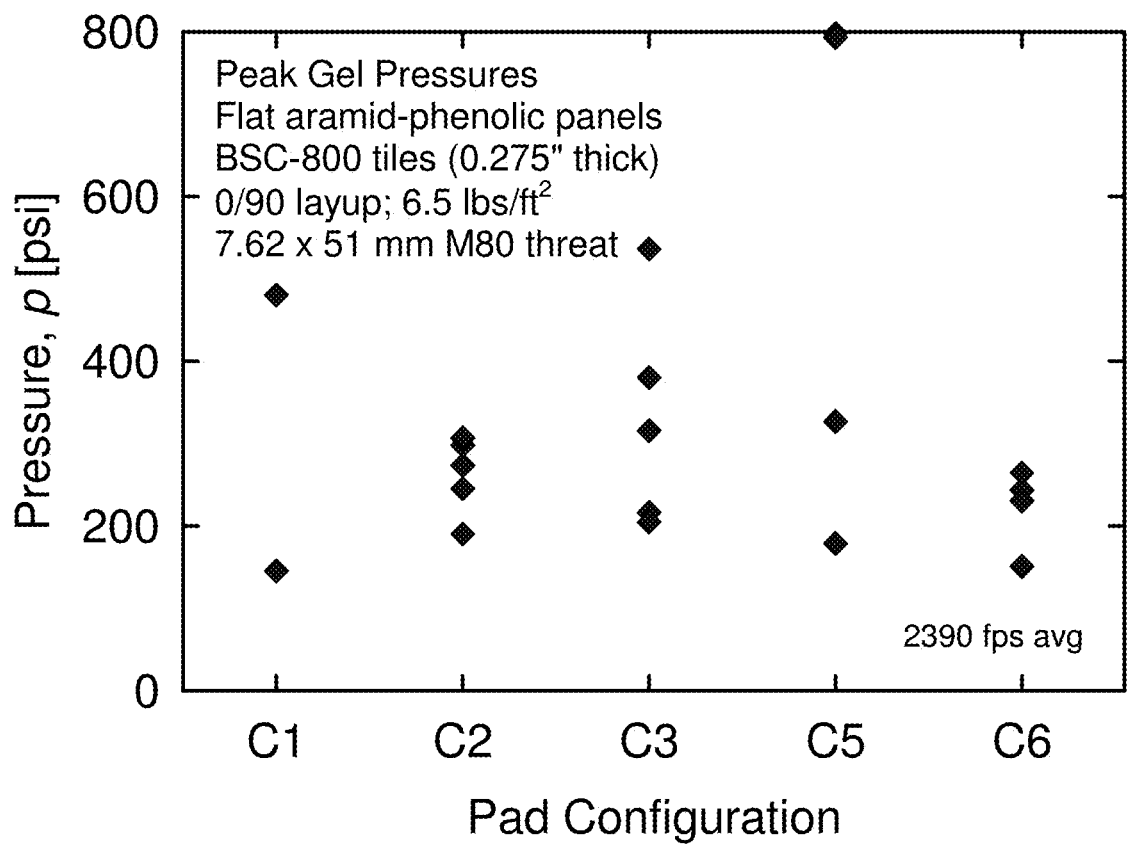
FIG. 7 shows pad configuration effects on peak gel pressure for the 7.62×51 mm M80 ball threat.

Results from another phase of testing (shown in FIGS. 6 and 7) show peak pressures in the brain surrogate gel as a function of pad configuration. The first panel tested against the 7.62×39 mm MSC threat was conducted using the original target velocity (2380 ft/sec, nominal muzzle), and this panel exhibited one perforation. All the subsequent tests were conducted at 1980 ft/sec nominal. The different velocities are distinguished in FIG. 6 by triangular and diamond-shaped data points. Pad configurations C3 and C2 exhibited the largest peak pressures and the largest scatter in peak pressures for both threats with the exception of a few very large values with the C5 and C1 configurations. In general, the measured peak pressure values were at or below 400 psi. In FIG. 7, the two ~800 psi data points for the C5 pad configuration and 7.62×51 mm M80 threat are questionable. These data were obtained from one sensor, which may be faulty. The 7.62×39 mm results show a relatively strong effect of velocity, over the 400 ft/sec velocity range.

The largest pressures and scatter occurred with the smallest area pad configuration, C3. The between-the-pad shot configurations, C5 and C6, showed that peak pressure and scatter tends to decrease with increased pad spacing. Comparing pressure magnitudes between the clocked and 0/90 layup tests for identical pad configurations shows that the clocked panels exhibited higher peak gel pressures with the 64 gr. RCC and 9 mm FMJ threats, and similar (C3) or lower (C5 and C6) pressures with the 7.62×51 mm M80 threat.

Figure 8:
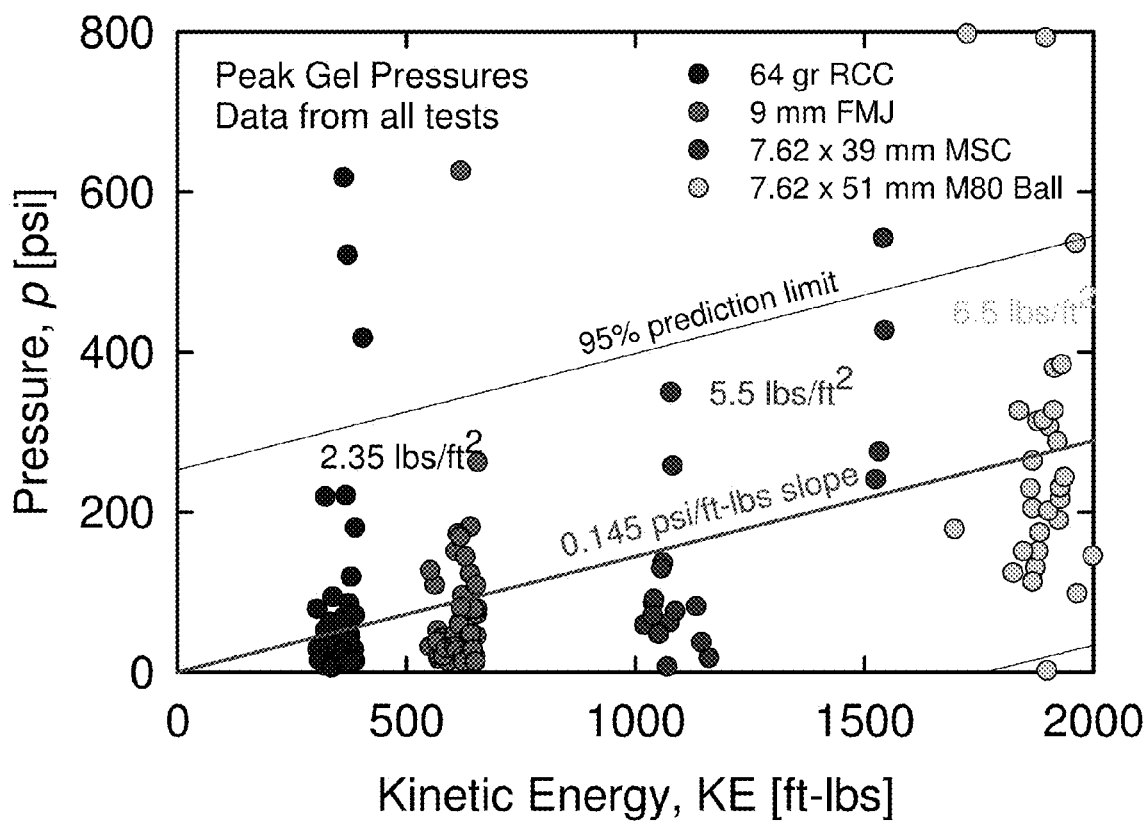
FIG. 8 shows the peak gel pressure versus kinetic energy for several tests. Panel areal densities, slope of a line least-squares fit to the data, and the 95% prediction limits are shown.

FIG. 8 combines data into one single plot of peak pressure versus threat kinetic energy. Here, the data tend to group more tightly for each threat, and only a small proportion of the data (7 out of 156 points) lie outside of the 95% upper prediction limit. A linear relationship between peak gel pressure and kinetic energy is clear.

Skull Surrogate Materials Damage Assessment

Post-test visual inspections of the skull skin and bone surrogate components showed that a variety of mechanical damage modes could occur including tearing and perforation of the scalp skin, and delamination, plastic bulging, cracking, fragmentation, and total disintegration of the skull bone plates.

Table 1 lists post-test skull plate conditions under three categories: survived, fractured, and perforated. The results showed that the 7.62 mm rifle shots were particularly damaging. All of the skull plates used in the 7.62×51 mm M80 ball tests were fractured, most totally destroyed by fragmentation, and 58% of the plates exhibited fractures with the 7.62×39 mm MSC threat. The 64 gr. RCC threat produced a significant number of perforations with the clocked panel layups. The 9 mm FMJ was the least damaging threat, skull surrogate-wise, followed by the 64 gr. RCC and 7.62×39 mm MSC threats. A number of the plates tested against the 64 gr. RCC and 9 mm FMJ threats experienced a peculiar out-of-plane bulging at the shot impact points that only became evident some time after testing. This was thought to be due to a combination of delamination of the core layer from the face sheets in conjunction with large residual strains in face sheets (cortical tables) that would eventually produce the bulging.

TABLE 1

Skull plate damage/survival summary;
"Total" refers to the number of skull surrogate plates included in summary. Against the 64 gr. RCC threat, the skull plates experienced one perforation with the 0/90 layup and all the rest of the damage occurred with the clocked layup panels. Against the 7.62 × 39 mm MSC threat, there was only one perforation that occurred at the 2380 ft/sec striking velocity (5%). Survived means that the skill plate was not perforated or fractured.

| Threats | % Survived | % Fractured | % Perforation | Total |
|---|---|---|---|---|
| 64 gr RCC | 83% | 4% | 13% | 52 |
| 9 mm FMJ | 96% | 2% | 2% | 52 |
| 7.62 × 39 mm MSC | 37% | 58% | 5% | 19 |
| 7.62 × 51 mm M80 | 0% | 100% | 0% | 33 |
| TOTALS | 64% | 30% | 6% | 156 |

Figure 9:
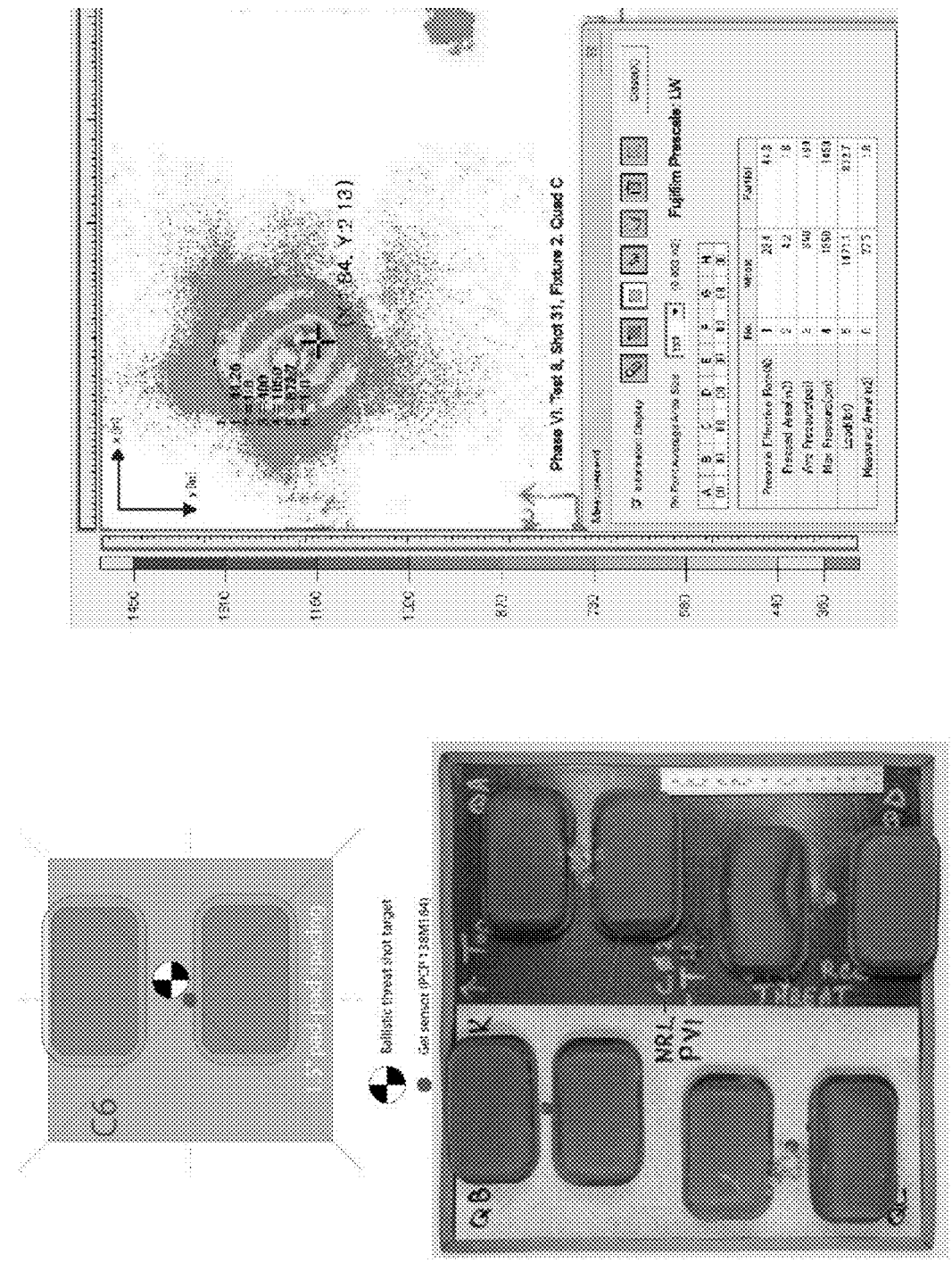
FIG. 9 shows pad configuration, Fujifilm pressure mapping and post-test photo of the back face of the helmet panel for a test against 9 mm FMJ threat at 1522 ft/sec. The Fujifilm mapping shows significant backface contact of the helmet panel with the skull surrogates between the pads, resulting in an impact force estimate of ~300 lbs (oval area in mapping).

In one test, a 9 mm FMJ shot impacted at 1522 ft/sec on a 0/90 layup helmet panel with the dual-small-pad configuration, C6. The peak pressure, 47.5 psi, was close to average for this threat. The initial backface contact with the skull surrogates was at 4.100 ms and then more substantial contact (filling the pad gap) was at 4.300 ms, and these times are just prior to the occurrence of the pressure peaks. In FIG. 9, the Fujifilm mapping shows significant between-pad impact from the panel backface, with an integrated impact load of 300 lbs.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

The invention claimed is:

1. A testing apparatus to assess ballistic performance of helmet personnel protective equipment subjected to a non-perforating ballistic impact, comprising:
   a flat helmet analogue, comprising a helmet shell material in flat panel form, the helmet shell material having an outer surface and an inner surface, wherein the inner surface of the helmet shell material comprises at least one helmet suspension pad attached thereto;
   a flat biofidelic head surrogate comprising a skull skin surrogate, a skull bone surrogate, and a brain tissue surrogate, wherein the helmet suspension pad of the flat helmet analogue is adjacent to the flat biofidelic head surrogate;
   a pressure sensor provided between the helmet suspension pad and the flat biofidelic head surrogate providing data regarding impact force; and
   one or more pressure sensors within the brain tissue surrogate providing data regarding pressure in the brain tissue surrogate,
   wherein the testing apparatus provides data comprising indicators of loads transmitted to the flat biofidelic head surrogate, fracture of the biofidelic skull bone surrogate, and intercranial pressure when the flat helmet analogue is subjected to a non-perforating ballistic impact.

2. The testing apparatus of claim 1, wherein the response data are representative of responses of a 3-D helmet to said ballistic impact.

3. The testing apparatus of claim 1, wherein the testing apparatus provides response data selected from the group consisting of dynamic impact force, deformation, skull bone surrogate damage, skull skin surrogate damage, brain tissue surrogate damage, and combinations thereof.

4. The testing apparatus of claim 1, wherein the helmet shell material comprises an aramid-phenolic composite.

5. The testing apparatus of claim 1, wherein the flat helmet analogue additionally comprises a ceramic tile.

6. The testing apparatus of claim 1, wherein the flat biofidelic head surrogate components have geometric features and material properties representative of a human head.

7. The testing apparatus of claim 1, further comprising a pressure indicating film provided between the skull skin surrogate and the skull bone surrogate.

8. The testing apparatus of claim 1, additionally comprising one or more sensors selected from the group consisting of a pressure sensor between the skull skin surrogate and the skull bone surrogate; a strain gauge on the helmet shell, the skull bone surrogate, or both; a force sensor between the suspension pad and the flat biofidelic head surrogate components; a displacement gauge between the helmet analogue and the flat biofidelic head surrogate components; ink-filled spheres in the brain tissue surrogate that rupture at a given pressure; and combinations thereof.

9. The testing apparatus of claim 1, additionally comprising an imaging system.

10. A method to assess ballistic performance of helmet personnel protective equipment, comprising:
    impacting a ballistic threat into a flat helmet analogue coupled with flat biofidelic head surrogate components, wherein the flat helmet analogue comprises a helmet shell material in flat panel form and at least one helmet suspension pad, and wherein the flat biofidelic head surrogate components comprise a skull skin surrogate, a skull bone surrogate, and a brain tissue surrogate;
    obtaining data from a pressure sensor provided between the helmet suspension pad and the flat biofidelic head surrogate components;
    obtaining data from one or more pressure sensors within the brain tissue surrogate; and
    assessing ballistic performance of the flat helmet analogue based on data comprising indicators of loads transmitted to the flat biofidelic head surrogate, fracture of the biofidelic skull bone surrogate, and intercranial pressure when the flat helmet analogue is subjected to a non-perforating ballistic impact.

11. The method of claim 10, wherein the response data are representative of responses of a 3-D helmet to said ballistic impact.

12. The method of claim 10, wherein obtained data comprises response data selected from the group consisting of dynamic impact force, deformation, skull bone surrogate damage, skull skin surrogate damage, brain tissue surrogate damage, and combinations thereof.

13. The method of claim 10, wherein the helmet shell material comprises an aramid-phenolic composite.

14. The method of claim 10, wherein the flat helmet analogue additionally comprises a ceramic tile.

15. The method of claim 10, wherein the flat biofidelic head surrogate components have geometric features and material properties representative of a human head.

16. The method of claim 10, further comprising obtaining data from a pressure indicating film provided between the skull skin surrogate and the skull bone surrogate.

17. The method of claim 10, additionally comprising obtaining data from one or more sensors selected from the group consisting of: a pressure sensor between the skull skin surrogate and the skull bone surrogate; a strain gauge on the helmet shell, the skull bone surrogate, or both; a force sensor between the suspension pad and the flat biofidelic head surrogate components; a displacement gauge between the helmet analogue and the flat biofidelic head surrogate components; ink-filled spheres in the brain tissue surrogate that rupture at a given pressure; and combinations thereof.

18. The method of claim 10, additionally comprising obtaining data using an imaging system.

19. A testing apparatus to assess ballistic performance of personnel protective equipment, comprising:
a flat analogue of personnel protective equipment;
flat biofidelic body surrogate components representative of a body region protected by the flat analogue, the flat biofidelic body surrogate components comprising a bone surrogate, and one or more additional biofidelic body surrogate components selected from the group consisting of a skin surrogate, a muscle surrogate, an organ tissue surrogate, and combinations thereof, wherein the flat analogue is adjacent to the flat biofidelic body surrogate components; and
one or more pressure sensors provided between the flat analogue and flat biofidelic body surrogate components,
wherein the testing apparatus provides data comprising indicators of loads transmitted to the flat biofidelic body surrogate, fracture of the biofidelic bone surrogate, and pressure in the flat biofidelic body surrogate when the flat analogue is subjected to a non-perforating ballistic impact.

20. The testing apparatus of claim 1, wherein the ballistic impact is a non-perforating ballistic impact.

* * * * *